(12) United States Patent
Walter et al.

(10) Patent No.: US 8,135,006 B2
(45) Date of Patent: Mar. 13, 2012

(54) LAST MILE HIGH AVAILABILITY BROADBAND (METHOD FOR SENDING NETWORK CONTENT OVER A LAST-MILE BROADBAND CONNECTION)

(75) Inventors: Edward Walter, Boerne, TX (US);
Yolius Diroo, San Antonio, TX (US);
Michael Raft, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 794 days.

(21) Appl. No.: 11/315,699

(22) Filed: Dec. 22, 2005

(65) Prior Publication Data

US 2007/0147234 A1    Jun. 28, 2007

(51) Int. Cl.
*H04L 12/28* (2006.01)

(52) U.S. Cl. ......................... 370/389; 370/397

(58) Field of Classification Search .................. 370/356, 370/365, 389, 395.1, 397, 484
See application file for complete search history.

(56) References Cited

U.S. PATENT DOCUMENTS

| | | | |
|---|---|---|---|
| 6,253,247 B1 * | 6/2001 | Bhaskar et al. ............... | 709/237 |
| 6,310,894 B1 * | 10/2001 | Counterman .................. | 370/484 |
| 6,490,296 B2 * | 12/2002 | Shenoi et al. ................. | 370/469 |
| 6,577,863 B2 | 6/2003 | Bourlas et al. | |
| 6,640,239 B1 * | 10/2003 | Gidwani ....................... | 709/203 |
| 6,665,296 B1 | 12/2003 | Sturza et al. | |
| 6,751,417 B1 * | 6/2004 | Combs et al. ................. | 398/71 |
| 6,760,327 B1 * | 7/2004 | Manchester et al. .......... | 370/364 |
| 6,785,750 B1 | 8/2004 | Odenwald | |
| 6,834,038 B1 * | 12/2004 | Zelig et al. .................... | 370/217 |
| 6,853,647 B1 | 2/2005 | Rawson et al. | |
| 6,987,763 B2 | 1/2006 | Rochberger et al. | |
| 7,023,794 B2 | 4/2006 | Khan et al. | |
| 7,103,003 B2 * | 9/2006 | Brueckheimer et al. ...... | 370/252 |
| 7,190,903 B1 * | 3/2007 | Combs et al. ................. | 398/71 |
| 7,450,850 B2 * | 11/2008 | Combs et al. ................. | 398/72 |
| 7,471,777 B2 * | 12/2008 | Bremer et al. ................ | 379/93.08 |
| 7,630,412 B2 * | 12/2009 | Wright et al. ................. | 370/536 |
| 7,636,358 B1 * | 12/2009 | Manchester et al. .......... | 370/394 |
| 7,889,646 B2 * | 2/2011 | Wright .......................... | 370/230 |
| 7,969,873 B2 * | 6/2011 | Rozental ....................... | 370/230 |
| 2005/0030974 A1 * | 2/2005 | Wright et al. ................. | 370/468 |
| 2005/0188405 A1 * | 8/2005 | Lee et al. ...................... | 725/63 |
| 2005/0259632 A1 | 11/2005 | Malpani et al. | |
| 2005/0262393 A1 | 11/2005 | King et al. | |
| 2005/0283529 A1 | 12/2005 | Hsu et al. | |
| 2006/0002294 A1 | 1/2006 | Chapman et al. | |
| 2006/0067297 A1 | 3/2006 | Chaar et al. | |
| 2006/0072480 A1 | 4/2006 | Deval et al. | |

\* cited by examiner

*Primary Examiner* — Dang Ton
*Assistant Examiner* — Brian O Connor
(74) *Attorney, Agent, or Firm* — Jackson Walker L.L.P.

(57) ABSTRACT

This disclosure provides a method transmitting a network content, comprising: receiving a first data stream of a network content over a first link; forming a second and third data streams from the first data stream; sending the second data stream over a second link and the third data stream over a third link; and aggregating the second and third data streams to form the first data stream. In the present method, the first data stream may be split or load-balanced over the second and third data streams. The method further provides pulling packets from the second and third data streams; discarding duplicate packets; and assembling the remaining packets according to a protocol sequence number. The method also provides for monitoring links and for switching the data stream from a link that may be degraded.

9 Claims, 5 Drawing Sheets

LAST MILE HIGH AVAILABILITY BROADBAND (METHOD FOR SENDING NETWORK CONTENT OVER A LAST-MILE BROADBAND CONNECTION)

BACKGROUND OF THE DISCLOSURE

1. Field of the Disclosure

The present disclosure relates to the field of last-mile connections between network and user locations.

2. Background

Broadband communication networks provide a variety of network content, including data content from the Internet, voice content using Voice over Internet Protocol (VoIP), and video content such as Video on Demand (VoD) to network users. A majority of broadband connections between a network and the users are either in the form of a Digital Subscriber Line (DSL) connection in which customers access the network over ordinary copper telephone lines, or via cable broadband service connection from a cable service provider. Wireless connections are also used for providing connections between a user and a network.

Within a typical network, multiple routes are used for sending network content from one end of the network to another end so that if one route becomes inoperative, the content can still reach its destination over an alternate route. However, the connection from the customer to the network is typically provided over a single link, such as a DSL link or a cable link. In such cases, the customer loses the connection to the network if that link experiences a failure and the customer service is restored once the problem with the link is restored. No redundancy is typically available for such a link. Additionally, the customer link is typically bandwidth limited. The demand for higher bandwidth by customer is increasing, and the demand increases the single customer link may not be able to provide the desired bandwidth. Thus, there is a need to provide a more reliable connection between the network and customers and also to provide greater bandwidth over existing links.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals and wherein.

DETAILED DESCRIPTION OF THE DISCLOSURE

In view of the above, the present disclosure through one or more of its various aspects and/or embodiments is presented to provide one or more advantages, such as those noted below.

The present disclosure provides a computer-readable medium containing a set of instructions operative to cause a processor to execute a method, the method including: receiving a first data stream over a first link; forming from the first data stream a second data stream and a third data stream; sending the second data stream over a second link and the third data stream over a third link; and aggregating the second and third data streams to form the first data stream. The data streams generally include network content that is divided into packets transmittable using a packet-switching technology. In one aspect, forming the second and third data streams further include splitting the first data stream into the second and third data streams. In an alternate aspect, forming the second and third data streams further includes balancing a load of the first data stream over the second and third data streams.

The computer-readable medium may be implemented at one or more network edge routers usable for sending the second and third data streams over the second and third links to a user location. The links may be monitored for any degradation in performance, and sending the second and third data streams further include switching a data stream between the second link and the third link. The method included in the computer-readable medium of the disclosure may be used, in one aspect, to increase a bandwidth of the network content. Aggregating the second and third data streams further includes: pulling packets containing portions of the network content from the second and third data streams; discarding duplicate packets pulled from the second and third data streams; and assembling the remaining packets according to a protocol sequence number.

The present disclosure also provides an apparatus that includes a processor, associated memory and computer program. The apparatus in one aspect receives the network content and sends the received content over two or more links to customer premise equipment. In one aspect, the processor switches sending the network content between the two or more links if one of the links is degraded. In another aspect, the processor divides the network content and substantially simultaneously sends the divided data over the two or more links. The apparatus also may include a device that aggregates the divided data into the network content.

Figure 1:
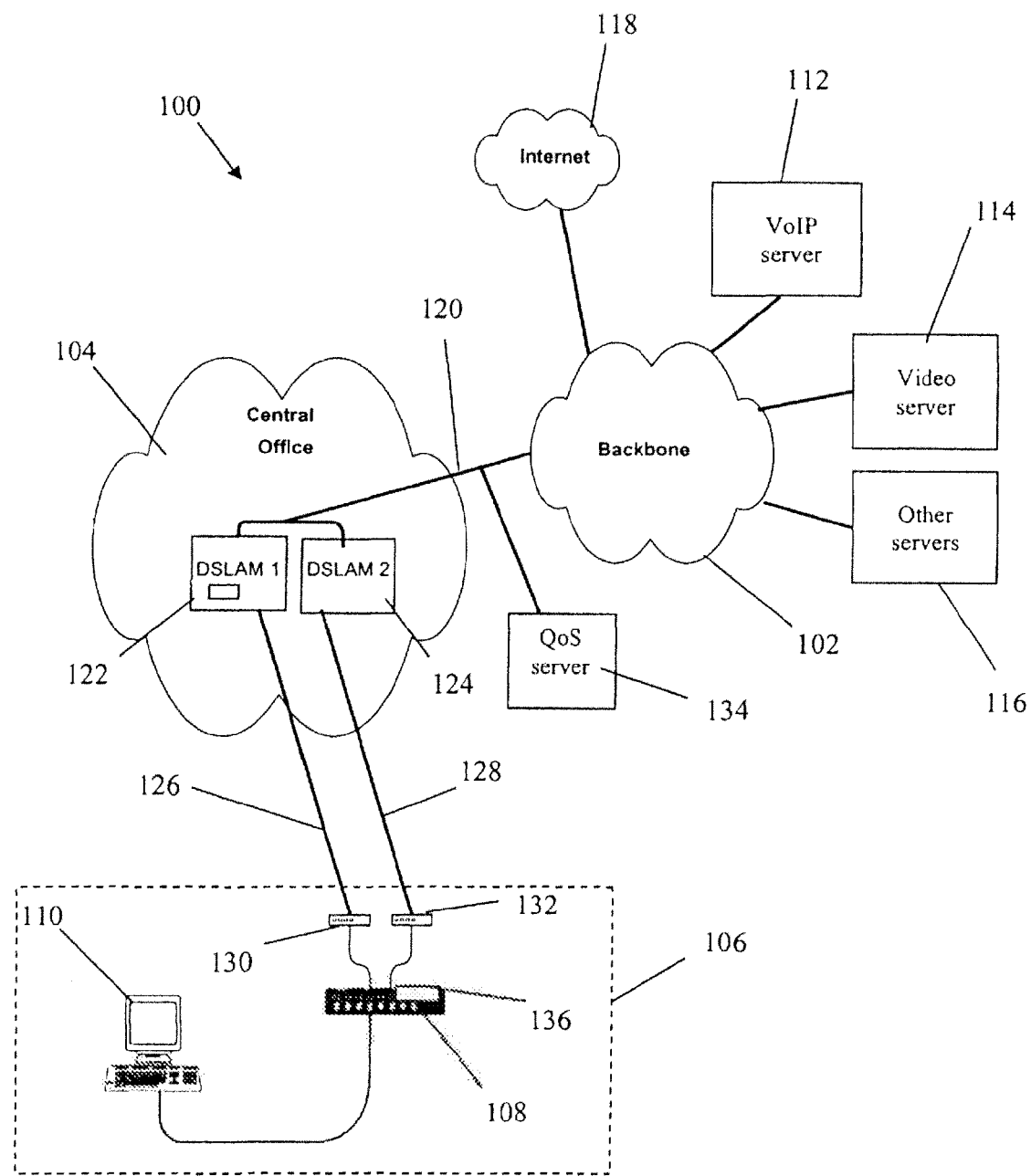
FIG. 1 illustrates an example of a network system for providing network content to users according to one aspect of the present disclosure.

FIG. 1 illustrates an example of a network system 100 for providing network content to users according to one aspect of the present disclosure. The network system includes a network backbone 102 for providing network content, such as voice, video and data, using packet-switching technology to one or more central offices; a central office 104 that include devices for providing the network content to network users at multiple user locations; and a user location 106 that includes one or more customer premises equipment (CPE) designed to access a variety of services, such as data service, video service, and voice service, from the network. The backbone 102 connects to one or more servers that provide various forms of network content. As an example, the backbone 102 shown in FIG. 1 connects to a Voice over Internet Protocol (VoIP) server 112 for providing a voice signal content, a video server 114 for providing video content, and various other servers 116 that provide network content. The exemplary backbone 102 also provides a connection to the Internet 118, for providing data content.

Network content may be provided from the backbone to the central office over one or more high-speed connections, such as link 120. A network monitoring device, such as Quality of Service server 134, is connected at a suitable location in the network, such as at link 120, and runs an executable program for monitoring performance parameters of various network elements, such as routers, servers, and links of the network system 100. The QoS server 134 may also have a database for storing values of the various parameters. In one aspect, the QoS server may provide a signal to the network that indicates a degradation in performance of one or more network elements, such as a reduction in the available bandwidth at a network element, network link, etc. The degradation in performance may be determined by referring, for example, to value of the parameters stored in the database associated with the QoS server.

The central office 104 is equipped with, among other things, one or more network edge routers for providing content over one or more links to a user location using packet-switching technology. As shown in the example of FIG. 1, one such network edge router may be Digital Subscriber Line Access Multiplexer (DSLAM), which interacts with network users over one or more Digital Subscriber Line (DSL) connections. A DSLAM is a device used to provide Digital Subscriber Line (DSL) connections to multiple customer locations and to link multiple customer DSL connections into a single high-speed network. The DSLAM generally aggregates signals from the multiple customers and separates these signals according to signal type. For example, the DSLAM may separate voice signals and data signals, onto their appropriate networks, such as a voice network and a data network, respectively. When DSL is used, the customer links over which the DSL signal is sent are typically copper wires used for telephone connections. Although the present disclosure is described in the context of a DSL connection, it is understood that the present disclosure may be implemented with other devices that provide network content to a customer location using different connective technology, such as a cable connection.

In the example of FIG. 1, the central office 104 has at least two DSLAMs (e.g., DSLAM1 122 and DSLAM2 124) that connect to a single user location over two DSL links (e.g., link 126 and link 128, respectively). The DSLAMs are able to transfer data between each other over a network link, such as link 120. It is understood that while the disclosure is described with respect to two links between a single user location and a central office, the disclosure may also be implemented using more than two links between the single user location and the central office. It is also understood that the two or more network edge routers (i.e., DSLAMs) used in the present disclosure need not reside at the same central office and may reside at central offices operated by different service providers as long as data may be transferred between them over a network link. It is also understood that customer links 126 and 128 and any other customer links originating from the same user location may terminate at a single network edge router, such as DSLAM1 122.

The central office further includes a processor that executes a program to manage the flow of traffic over the multiple links (e.g., links 126 and 128) to the user location 106. The processor may be located at any device in the central office, such as DSLAM1 122 or DSLAM2 124. In one aspect, an executable program run by the processor sends network content over exemplary links 126 and 128 in a manner that provides a redundancy of the network link. For example, the program may send the network content over link 126 until a signal is received, for example from the QoS server, which indicates a degradation of performance on link 126. When the processor receives the signal, it automatically switches to sending the network content over link 128.

In another aspect, an executable program run by the processor may provide two or more data streams to the user location over two or more links, such as links 126 and 128. When the network content is split over multiple links, a greater bandwidth may be obtained than when a single link is used. In another aspect, an executable program run by the processor may split network content from the central office so that the network content is balanced over link 126 and link 128.

The user location 106 includes various customer premises equipment (CPE) for accessing content from the various network service. According to one aspect of the disclosure, the user location includes two or more terminating devices, such as modems 130 and 132 to terminate the customer links 126 and 128, respectively. The user location may also include a device 136 connected to each of the modems 130 and 132 for aggregating network content received at the two or more modems. The aggregating device may be provided as a separate device or, as described herein, integrated into another device, such as customer router 108. The customer router also provides the aggregated network content to the various CPE, which may include a computer 110 for receiving data content, an IP Phone for sending and receiving a voice signal content over VoIP, a set top box for receiving a video signal content, etc. The customer router also maps two or more separate broadband circuits to two or more separate links. For data received from the network, the customer router aggregates the multiple signals, and for data to be sent to the network, the customer router separates or splits the data to be sent to the network over multiple links.

At the user location, customer router 108 or the device 136 includes a processor that executes a program for aggregating the network content received from the central office. The customer router monitors each link (e.g., link 126 and link 128) for network content and synchronizes the order of received packets and interleaves the packets to re-assemble the network content from the server, such as the video server.

Figure 2:
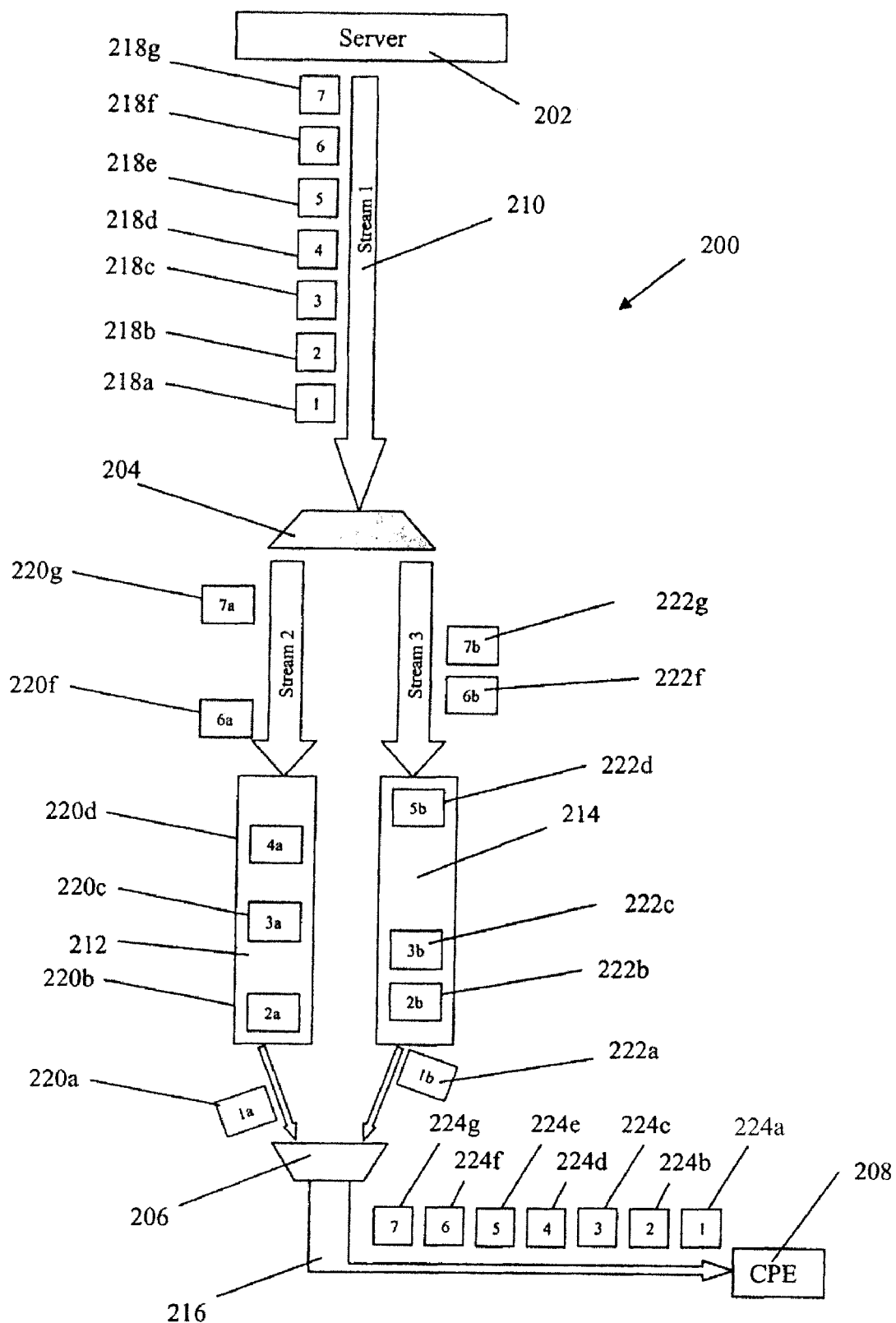
FIG. 2 illustrates an exemplary connection for providing network content between a network server and customer premises equipment according using multiple data streams.

FIG. 2 illustrates an exemplary connection 200 for providing network content between a network server 202 and CPE 208 using multiple data streams. The connection includes a network server 202 for providing network content in the form of a first data stream, a splitter 204 capable of forming one or more data streams from the first data stream, an aggregator 206 for forming a single data stream from the one or more data streams and CPE 208 designed to access and utilize the network content received from the network servers. The network server 202 may be, for example, a VoIP server providing voice content, a video server providing video content, an Internet connection providing data content, or any other network content server that sends content using a packet-switching technology.

The splitter 204 generally includes a computer-readable medium containing a set of instructions, and a processor for executing these instructions. In one aspect, the processor of the splitter forms one or more data streams from a first data stream. In another aspect, the processor of the splitter tracks parameters relating to the flow of data through the splitter. The splitter further includes a database for tracking and storing values of these parameters. Parameters values may be accessed from the splitter database, for instance, by the QoS server 134. The splitter may reside at any place in a network, such as at a DSLAM. The aggregator 206 includes a computer-readable medium containing a set of instructions, and a processor for executing these instructions. In one aspect, the processor of the aggregator forms a single data stream from one or more data streams. In another aspect, the processor of the aggregator tracks parameters related to the flow of data through the aggregator. The aggregator further includes a database for tracking and storing values of these parameters. Parameter values may be accessed from the aggregator database, for instance, by the QoS server 134. The aggregator is generally located at a device at the user location, such as a gateway device (e.g., a router or a modem). The various CPE devices 216 may include a personal computer for accessing data content, an IP Phone for receiving and sending a VoIP voice signal content, and set top box for receiving a video signal content, as well as any other devices suitable for accessing a network content.

Still referring to FIG. 2 the network server 202 provides network content in the form of a first data stream 210 to the splitter 204. At the splitter, the data stream 210 is generally divided into packets, such as exemplary packets #1-#7 (218a-218g), employing a packet-switched technology. The packets generally have a header that contains information useful for the transfer of the packet through the network and a payload that contains the content of the packet. The packets are typically sequenced according to a protocol sequence number stored in the head of the packet. An exemplary protocol sequence number is a Realtime Transport Protocol (RTP) sequence number, where RTP is a standard for streaming real-time multimedia, such as voice and video, over IP in packets. The splitter forms one or more data streams, such as second data stream 212 and third data stream 214 shown in FIG. 2, from the first data stream 210. For illustrative purposes only, in reference to FIG. 1, second data stream 212 is sent over link 126 and third data stream 214 is sent over link 128. It is understood that while the disclosure is discussed with respect to two data streams between the splitter and the aggregator, any number of data streams, including a single data stream, may be formed at the splitter and sent over available links to the aggregator.

In one aspect of the invention, the splitter forms a second data stream 212 from the first data stream and sends the second data stream over a link (such as link 126 of FIG. 1) to the aggregator 206. When a signal is received indicating a degraded performance of the link 126 that may substantially affect the data stream 212, the splitter ends the second data stream, forms a third data stream 214, and sends the third data stream over an alternate link (such as link 128 of FIG. 1). The signal may be received at the splitter from any place on the network, such as the QoS server 134 of FIG. 1. The aggregating device 206 monitors data streams 212 and 214 and assembles a data stream 216 from the data stream(s) received. The data stream 216 is then sent to the appropriate CPE 208.

In another aspect of the invention, the splitter forms multiple data streams, such as second data stream 212 and third data stream 214, from the first data stream 210. Second data stream 212, which includes packets #1a-#4a, #6a, #7a (220a-220d, 220f, 220g), and third data stream 214, which includes packets #1b-#3b, #5b-#7b (222a-222c, 222e-222g), are copied from first data stream 210. Packet loss (such as the loss of packet #5a from the second data stream and the loss of packet #4b from the third data stream) may occur due to a variety of factors, such as noise on the links 126 and 128. Thus, the data streams received at the aggregator may not be exact copies of the first data stream 210. The aggregator assembles a resultant data stream 216 from second data stream 212 and third data stream 214 that is substantially the same as the first data stream 210.

The aggregator 206 selects packets from the multiple links based on the inter-arrival time and packetization interval. The inter-arrival time is the time of actual arrival between packets, and the packetization interval is the sampling interval typically used when generating packets. When a packet is received at the aggregator, the sequence number of the packet is read from the packet header. If the sequence number has not yet been received at the aggregator, the aggregator places the packet in a data stream such as data stream 216, according to a packet sequence. If the sequence number has already been received at the aggregator, the aggregator discards the payload.

Applying the selection process described above to the illustrative example of FIG. 2, the aggregator pulls packet #1a (220a) from the second data stream and discards packet #1b (222a) from the third data stream; pulls packet #2a (220b) from the second data stream and discards packet #2b (222b) from the third data stream; pulls packet #3b (220c) from the third data stream and discards packet #3a (222c) from the second data stream; pulls packet #4a (220d) from the second data stream; pulls packet #5b (222e) from the third data stream; pulls packet #6a (220f) from the second data stream and discards packet #6b (222f) from the third data stream; and pulls packet #7b (220g) from the third data stream and discards packet #7a (222g) from the second data stream. The remaining packets are interleaved to assemble a resultant data stream 216 including packets #1-#7 (224a-224g) in the same order as the first data stream 210.

In another aspect, the present disclosure may be used together with standard load balancing techniques, such as "round robin," "load based," and "content based." "Round robin" load balancing routes network content between the two or more links sequentially, i.e., a first content is sent over a first link and a second content is sent over a second link. "Load based" load balancing monitors the load of each link and routes content over the least congested link. "Content based" load balancing routes content over the links depending on the type of service, i.e, all HTTP traffic would be routed over a first link and all SMTP traffic would be routed over a second link. The type of load balancing may be configured, for example, at a device at the user location, such as customer router 108. Also, if a link is down, the load balancing process stops sending service requests over that link.

In an alternate aspect of the invention, the roles of the aggregator and splitter may be switched so that content from the user location may be sent to the network over multiple links and assembled at a network edge router, such as DSLAM1 122. The roles may be switched by switching the executable program run at the network edge router and the customer router.

Figure 3:
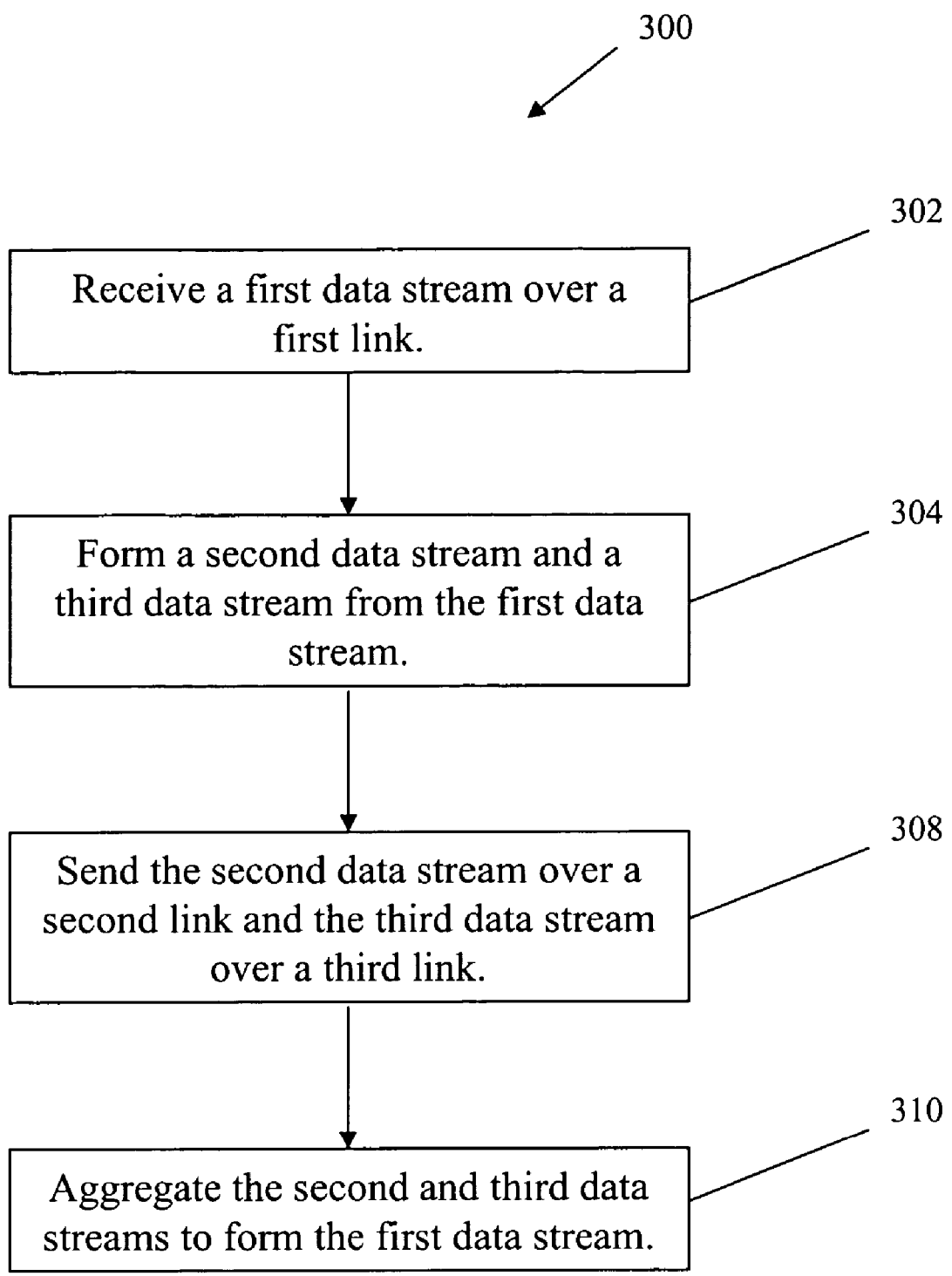
FIG. 3 illustrates a flowchart of one aspect of the disclosure for providing network content to a user location using multiple data streams.

FIG. 3 illustrates a flowchart 300 of one aspect of the disclosure for providing network content to a user location using multiple data streams. In Box 302, a first data stream is received over a first link. The first data stream typically includes voice content, video content, or data content received from an appropriate network server. In Box 304, a second data stream and a third data stream are formed from the first data stream. In a more general application of the disclosure, multiple data streams may be formed from the first data stream. The second and third data streams may be copies of the first data stream. Also, the second and third data streams may be formed using, for example, a standard load balancing technique. In one aspect, the second and third data streams are formed at a network edge router running an executable program on a processor. In Box 306, the second data stream is sent over a second link and the third data stream is sent over a third link. In Box 308, the second and third data streams are aggregated to form a data stream that is substantially the same as the first data stream. In one aspect, the second and third data streams are aggregated at a customer router running an executable program on a processor.

Figure 4:
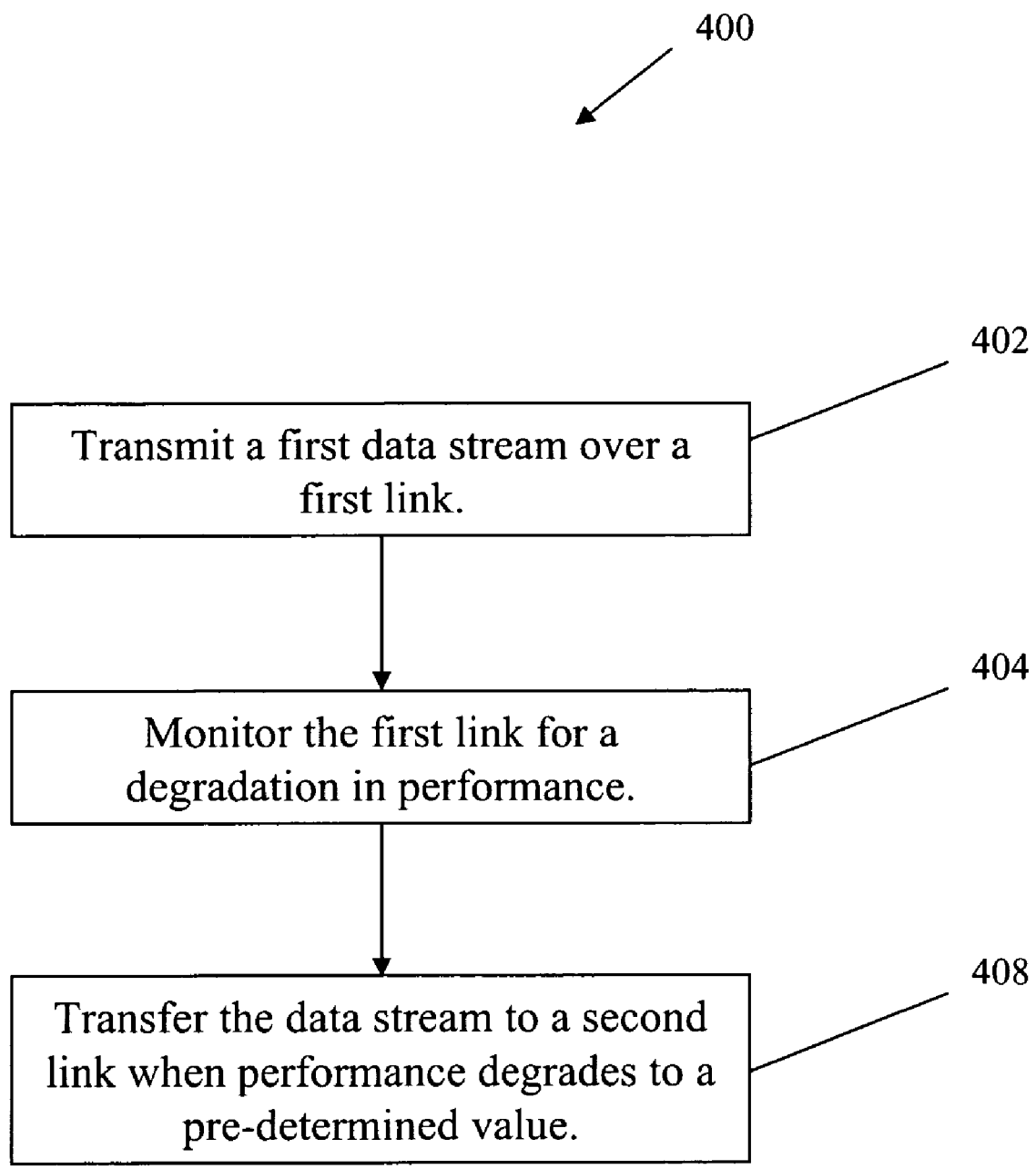
FIG. 4 illustrates a flowchart of one aspect of the present disclosure for providing network content to a customer location by implementing a redundant link.

FIG. 4 illustrates a flowchart 400 of one aspect of the present disclosure for providing network content to a customer location by implementing a redundant link. In Box 402, a first data stream is sent over a first of multiple links to a user location. In Box 404, the first link is monitored for degradation in the performance of the first link that may affect the network content. Monitoring of the first link may be performed at a processor at any location in the network, such as at a QoS server, at a DSLAM, etc. In Box 406, the processor switches the data stream to be sent over a second link when the performance of the first link degrades below a pre-determined value. The processor may switch links when it receives a signal, for example, from the monitoring device (i.e., QoS server) indicating degraded performance on the first link. As an example, the data stream may be switched over to the second link when the available bandwidth of the first link drops below a pre-determined value.

In one aspect of the disclosure, if two users are interacting with each other and both are implementing multiple links to the network as described in the present disclosure, the users may be a notified of the connection. In one example, a user may be notified by showing an icon at a computer monitor. The routers at both user locations would send a traceroute command and ping command down both links between customers in order to determine if the other user is using multiple connections.

Figure 5:
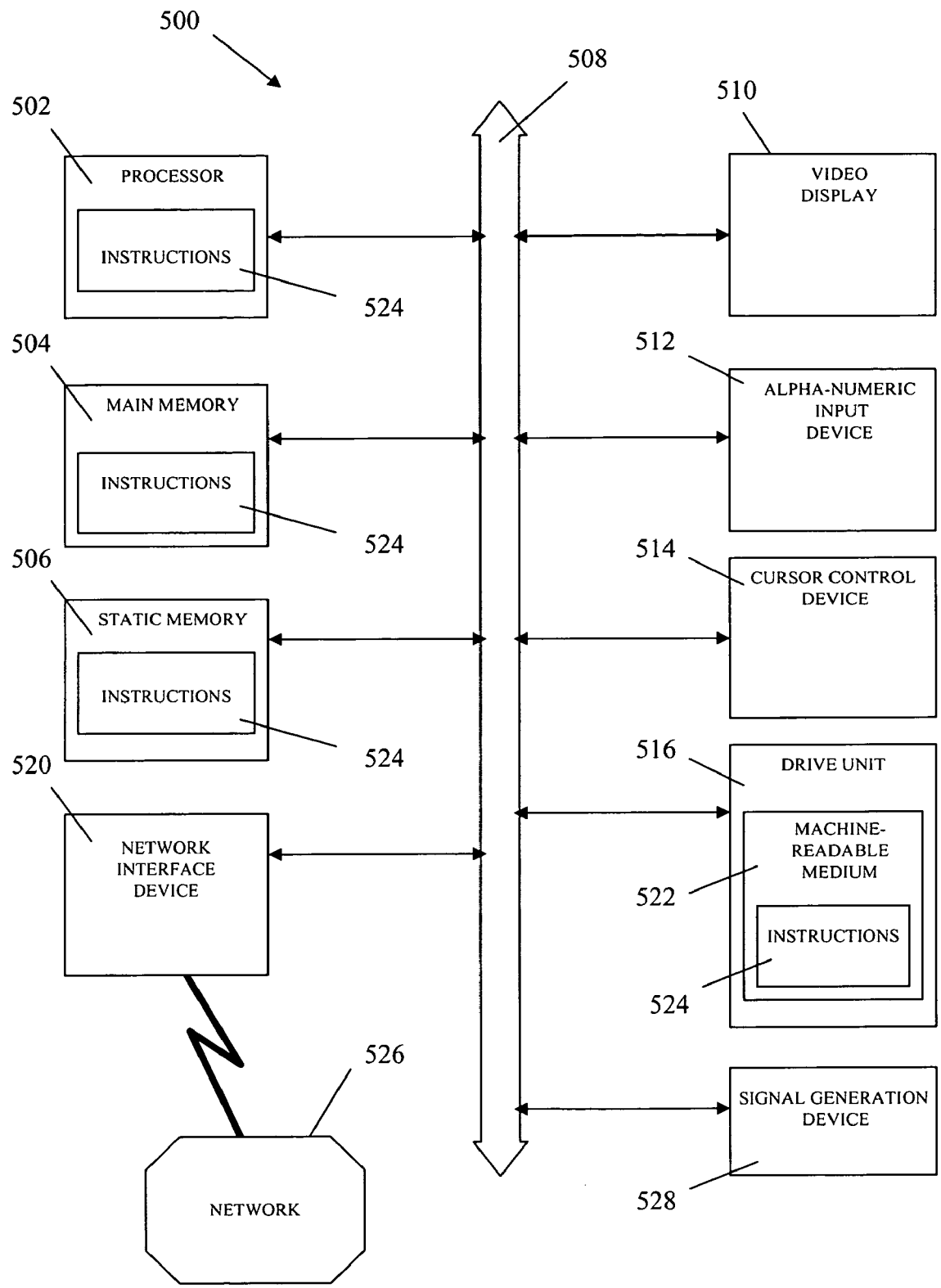
FIG. 5 is a diagrammatic representation of a machine in the form of a computer system within which a set of instructions, when executed, may cause the machine to perform any one or more of the methodologies discussed herein.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the invention is considered to include any one or more machine-readable medium as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer-readable medium containing a set of instructions operative to cause a processor to execute a method, the method comprising:
   receiving a first data stream over a first link;
   forming from the first data stream a second data stream and a third data stream;
   sending the second data stream over a second link to a first network edge router connected to a first terminating device and sending the third data stream over a third link to a second network edge router connected to a second terminating device; and
   aggregating the second data stream from the first terminating device and the third data stream from the second terminating device to assemble a resultant data stream substantially the same as the first data stream, wherein aggregating comprises pulling packets containing portions of the network content from the second data stream and from the third data stream, discarding duplicate packets pulled from the second data stream and the third data stream; and, after discarding the duplicate packets, assembling remaining packets according to a protocol sequence number
   wherein aggregating the second data stream and the third data stream further comprises:
      pulling packets containing portions of network content from the second data stream and third data stream; and
      assembling packets remaining after the discarding of duplicated packets according to a protocol sequence number.

2. The computer-readable medium of claim 1, wherein the data streams comprise network content divided into packets transmittable using a packet-switching technology.

3. The computer-readable medium of claim 1, wherein forming the second and third data streams further comprises balancing a load of the first data stream over the second and third links.

4. The computer-readable medium of claim 1, wherein sending the second and third data streams further comprises switching a data stream between the second link and the third link.

5. A method for providing network content to a customer premise equipment, comprising:
   receiving a first data stream relating to the network content over a first link;
   forming from the first data stream a second data stream connected to a first network edge router at a first central office and a third data stream connected to a second network edge router at a second central office;
   sending the second data stream over a second link from the first network edge router to a first terminating device and the third data stream over a third link from the second network edge router to a second terminating device, the first terminating device and the second terminating device being connected to the customer premise equipment; and
   aggregating the second data stream and the third data stream at the customer premise equipment, wherein aggregating comprises pulling packets containing portions of the network content from the second data stream and from the third data stream, discarding duplicate packets pulled from the second data stream and the third data stream; and, after discarding duplicate packets, assembling remaining packets according to a protocol sequence number.

6. The method of claim 5, wherein receiving the network content comprises receiving packets over a packet-switched network.

7. The method of claim 5, wherein forming the second and third data streams further comprises balancing a load of the first data stream over the second and third links.

8. The method of claim 5, wherein the network content is one of (i) a video content, (ii) a voice content, and (iii) a data content.

9. An apparatus for use in providing a network content over a communications network, comprising:
   a processor adapted to be coupled to a first link and a second link connected to a customer premise equipment via a first network edge router and a second network edge router, wherein the processor transmits a first portion of the network content over the first link and a second portion of the network content over the second link;
   an emulator that separates the network content into the first and second portions of the network content; and
   a device that aggregates the first and second portions of the network content, discards duplicative portions of the first and second portions, and after discarding the duplicative portions, assembles remaining portions according to a protocol sequence number to generate a resultant stream substantially the same as the network content.

* * * * *